V. KOHOUT.
PLOW EQUALIZER.
APPLICATION FILED OCT. 19, 1910.
1,002,706.
Patented Sept. 5, 1911.
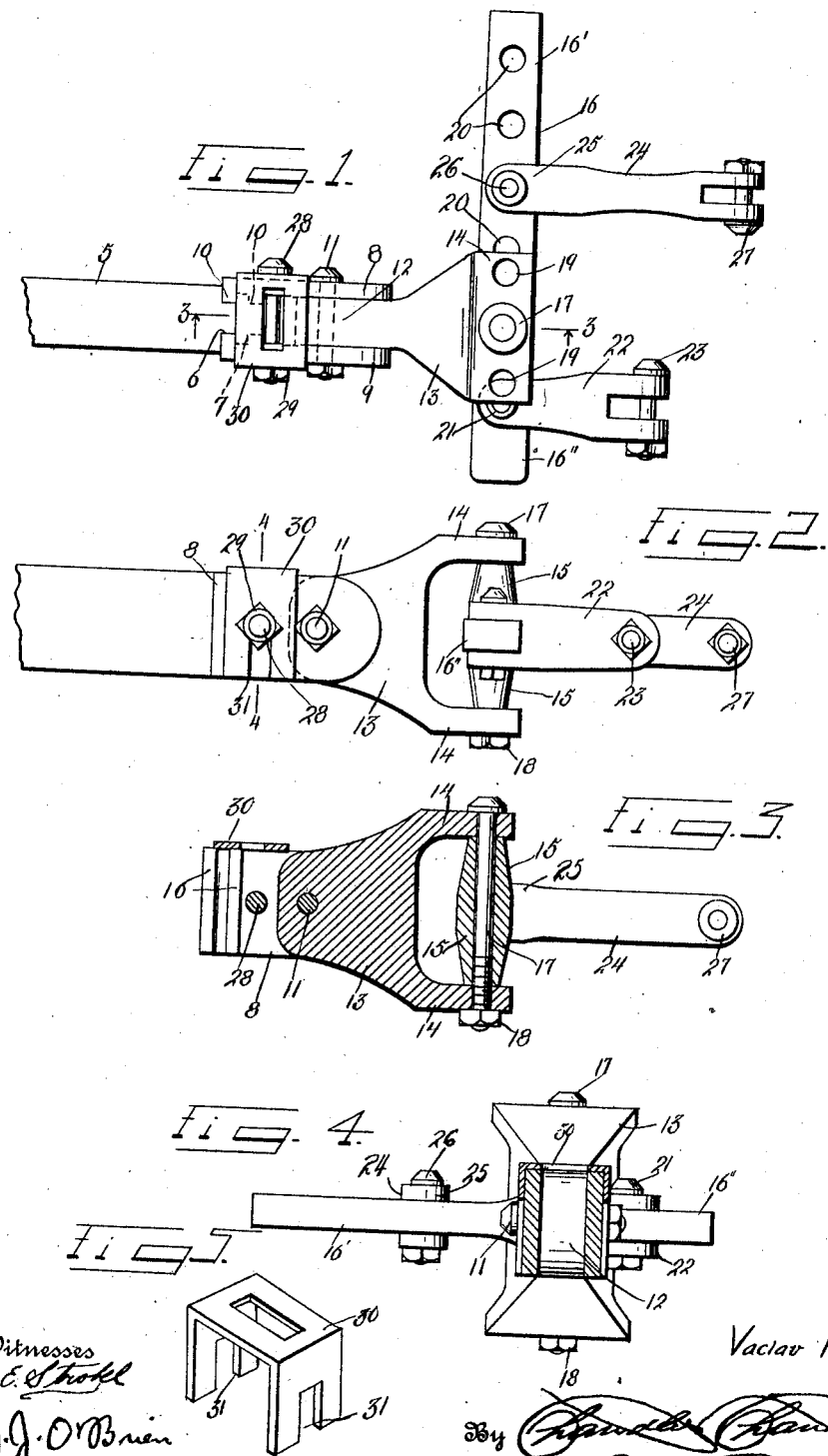
Witnesses
J. E. Strobl
J. J. O'Brien
Inventor
Vaclav Kohout.
By Chandler & Chandler
Attorneys

UNITED STATES PATENT OFFICE.

VACLAV KOHOUT, OF DORCHESTER, NEBRASKA.

PLOW-EQUALIZER.

1,002,706. Specification of Letters Patent. Patented Sept. 5, 1911.

Application filed October 19, 1910. Serial No. 587,954.

*To all whom it may concern:*

Be it known that I, VACLAV KOHOUT, a citizen of the United States, residing at Dorchester, in the county of Saline, State of Nebraska, have invented certain new and useful Improvements in Plow-Equalizers; and I do hereby declare the following to be a full, clear, and exact description of the invention, such as will enable others skilled in the art to which it appertains to make and use the same.

This invention relates to improvements in draft equalizers for plows and the leading object of the invention is to provide an equalizer for plows comprising an improved beam attaching device having a forked outer end to which an equalizing beam is secured and on the ends of said beam single tree connections are fastened.

With the above and other objects in view the invention consists in certain constructions, combinations and arrangements of parts, clearly described in the following specification and clearly illustrated in the accompanying drawings, in which:—

Figure 1 is a plan view showing the improved equalizer attached to the forward end of a plow beam. Fig. 2 is a side elevation thereof. Fig. 3 is a sectional view taken on the line 3—3 of Fig. 1 looking in the direction of the arrow. Fig. 4 is a transverse sectional view taken on the line 4—4 of Fig. 2. Fig. 5 is a detail perspective view of the clamping strap.

Referring to the accompanying drawings 5 denotes a plow beam the forward end of which is formed with recesses 6 spaced apart by shoulders 7 disposed on opposite sides of the forward ends of the beam 5, engaged by the clamping members 8 and 9 which engage the opposite sides thereof. Each of the clamping members is formed with longitudinally spaced projections 10 which fit into the recesses 6 and which projections 10 are spaced apart to receive the shoulders 7 of the beam 5. The forward ends of the clamping members 8 and 9 project forwardly of the end of the beam 5 and a pivot bolt 11 is passed through said forward ends. The pivot bolt 11 serves to secure the rear end 12 of the clevis 13 which is formed on its forward end with vertically spaced bearing arms 14 between which the trunnions 15 of the equalizer or evener beam 16 are disposed. A pivot bolt 17 extends through the trunnions 15 of the equalizer or evener beam 16 and is secured at its lower end by a nut 18 against the lower arm 14 of the clevis 13. The bearing arms 14 of the clevis 13 are formed with transversely spaced openings 19 whereby the trunnions 15 may be adjustably secured thereto, and the equalizer or evener beam 16 is formed with a long arm 16' and a short arm 16". The long arm 16' is preferably formed with four longitudinally spaced bolt openings 20 and the short arm 16" is preferably formed with a single bolt opening through which the pivot bolt 21 is passed. The pivot bolt 21 serves to secure the single tree connection 22, the rear end of which is bifurcated to straddle the arm 16". A pivot bolt 23 is passed across the bifurcated portions of the connection 22 for holding the clip of a single tree or whiffletree thereto. The connection 24 is somewhat longer than the connection 22 and is secured by its bifurcated rear end 25 and the pivot bolt 26 to the long arm 16' of the equalizer or evener beam, and the forward end of the connection 24 is bifurcated to receive the clip of a whiffletree or single tree and across the forward bifurcated end of the connection 24 a pivot bolt 27 is passed for pivotally securing the single tree or whiffletree thereto.

The clamp members 8 and 9 are secured to the beam 5 by means of a bolt 28 which extends through the members and beam and is held in place by a nut 29. A metallic band 30 is wrapped around the beam 5 and the members 8 and 9 and interposed between the head of the bolt 28 and the nut 29 whereby the members 8 and 9 will be more securely fastened to the beam 5. The band 30 is formed with bifurcated ends 31 whereby said band can be slipped between the head of the bolt 28 and the member 8 and the nut 29 and the member 9 and the nut 29 is tightened upon the bolt 28. By adjusting the connection 24 on the arm 16' of the evener beam the leverage of said arm 16' may be varied.

What is claimed is:—

The combination with a draft equalizer, of a clevis having a bifurcated forward end in which the equalizer is pivotally secured and a reduced rear end, clamping members pivoted to the rear end of the clevis and formed with spaced shoulders, a clamping bolt extending through the clamping members, and a band bent around the clamping members and having bifurcated ends for holding said clamping members securely against a plow beam.

In testimony whereof, I affix my signature, in presence of two witnesses.

VACLAV KOHOUT.

Witnesses:
ANNA N. SPIRK,
S. E. GOODELL.

Copies of this patent may be obtained for five cents each, by addressing the "Commissioner of Patents, Washington, D. C."